United States Patent [19]

Harlow et al.

[11] Patent Number: 5,417,954
[45] Date of Patent: May 23, 1995

[54] PHASES OF $NH_4AlF_4$ AND $AlF_3$

[75] Inventors: Richard L. Harlow; Norman Herron, both of Newark, Del.

[73] Assignee: E. I. Du Pont de Nemours and Company, Wilmington, Del.

[21] Appl. No.: 204,849

[22] Filed: Mar. 2, 1994

[51] Int. Cl.$^6$ ............................ C01B 9/08; C01F 7/50
[52] U.S. Cl. ........................................ 423/465; 423/489
[58] Field of Search ................ 423/465, 495, 489

[56] References Cited

U.S. PATENT DOCUMENTS

| | | | |
|---|---|---|---|
| 3,694,150 | 9/1972 | Kidde | 423/465 |
| 3,929,415 | 12/1975 | Wada et al. | 423/495 |
| 4,034,068 | 7/1977 | Aramaki et al. | 423/465 |
| 5,045,300 | 9/1991 | Marlett | 423/465 |

FOREIGN PATENT DOCUMENTS

| | | | |
|---|---|---|---|
| 244344 | 4/1987 | Germany | 423/489 |
| 251335 | 11/1987 | Germany | 423/489 |

OTHER PUBLICATIONS

Knop, O. et al, *Can. J. Chem.*, 63, 516–515, 1985.
Shinn, D. et al, *Inorg. Chem.*, 6, 1927–1933, 1966.

*Primary Examiner*—Wayne Langel

[57] ABSTRACT

New crystalline phases of the fluoroaluminum compounds $NH_4AlF_4$ and $AlF_3$ and processes for their preparation are disclosed.

9 Claims, 4 Drawing Sheets

PHASES OF NH4ALF4 AND ALF3

The present invention relates to new phases of the fluoroaluminum compounds $NH_4AlF_4$ and $AlF_3$, processes for their preparation, and a process for the preparation of known crystalline phases of $AlF_3$ from the new one.

The compound alpha-$NH_4AlF_4$ is well known and has been prepared via a route involving direct combination of aqueous $NH_4F$ and $AlF_3$, or by thermal decomposition of $(NH_4)_3(AlF_6)$. It has an extended fluoro bridged network layer structure in the solid state characterized by a square network of corner linked $AlF_6$ octahedra with ammonium ions between the layers. See Knop et al., Can. J. Chem. 1985, 63, 516. Thermal decomposition of alpha-$NH_4AlF_4$ to alpha and beta phases of $AlF_3$ has also been reported in Shinn et al., Inorg. Chem. 1966, 5, 1927-1933.

Fluoroaluminum compounds, particularly $AlF_3$, are important solid-state catalysts for chlorofluorocarbon isomerization and fluorination. $AlF_3$ is known to exist in several crystalline phases referred to as "alpha", "beta", "gamma" and the like. Existing art for preparing fluoroaluminum catalysts includes pyrolysis of precursors obtained from aqueous solution (usually with added HF), treatment of $Al_2O_3$ with HF at elevated temperature, and treatment of $AlCl_3$ with HF or chlorofluorocarbons. From aqueous solution, compounds such as $M^+AlF_4(H_2O)_2-$, $(M^+)_2AlF_5(H_2O)^{-2}$, or $(M^+)_3AlF_6^{-3}$, have been obtained. When pyrolyzed the aquo compounds lose primarily water, and if the cation $M^+$ is capable of decomposition or has a volatile fluoro compound, HF or MF is also lost. However, traces of oxygen tend to remain behind giving rise to small amounts of hydroxy- or oxy-aluminum species.

It has been established that the crystal phase of fluoroaluminum compounds is important to their catalytic properties. Thus it is desirable to control the crystal phase and the amount of hydroxy- or oxy-aluminum species in order to control use as catalyst. The present invention provides a new crystal phase of $AlF_3$, and a new crystal phase of $NH_4AlF_4$, a precursor to $AlF_3$, and methods for their preparation.

SUMMARY OF THE INVENTION

The present invention comprises a beta phase of $NH_4AlF_4$. This phase has a space group I4/mcm with unit cell parameters a of 11.64Å (1.164 nm) and c of 12.66Å (1.266 nm) at 25° C. The present invention further comprises a kappa phase of $AlF_3$ having space group P4/mbm, and unit cell parameters a of 11.41Å (1.141 nm) and c of 3.54Å (354 nm).

The present invention further comprises a process for the preparation of the beta phase of $NH_4AlF_4$ comprising heating pyridineHAlF4 with formamide. The present invention further comprises a process for the preparation of the kappa phase of $AlF_3$ comprising the pyrolysis of beta-$NH_4AlF_4$.

The present invention further comprises a process for the preparation of the alpha phase of $AlF_3$ comprising the pyrolysis of the kappa phase of $AlF_3$.

DETAILED DESCRIPTION OF THE INVENTION

Scheme 1 lists the chemical reactions as equations 1 to 3 for the processes of the present invention and for the preparation of the compounds of the present invention.

SCHEME 1

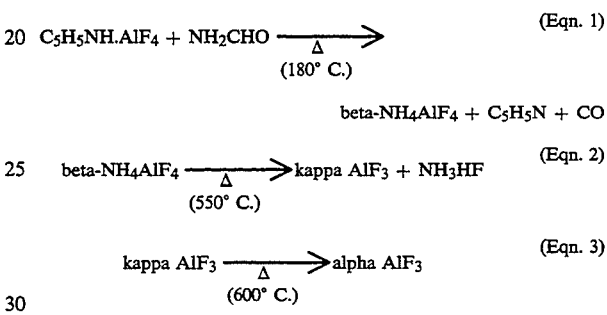

The present invention provides a process for the preparation of $NH_4AlF_4$ and its isolation as a solid in accordance with the reaction sequence depicted in equation 1. PyridineHAlF4 is heated under an inert gas, preferably nitrogen, to about 180° C. in formamide solvent. Pyridine is evolved from the solution and nascent HAlF4 material remains behind. The HAlF4 reacts with the formamide solvent eliminating carbon monoxide gas. A material having the composition beta-$NH_4AlF_4$ is precipitated from solution and isolated using known techniques.

Figure 1:
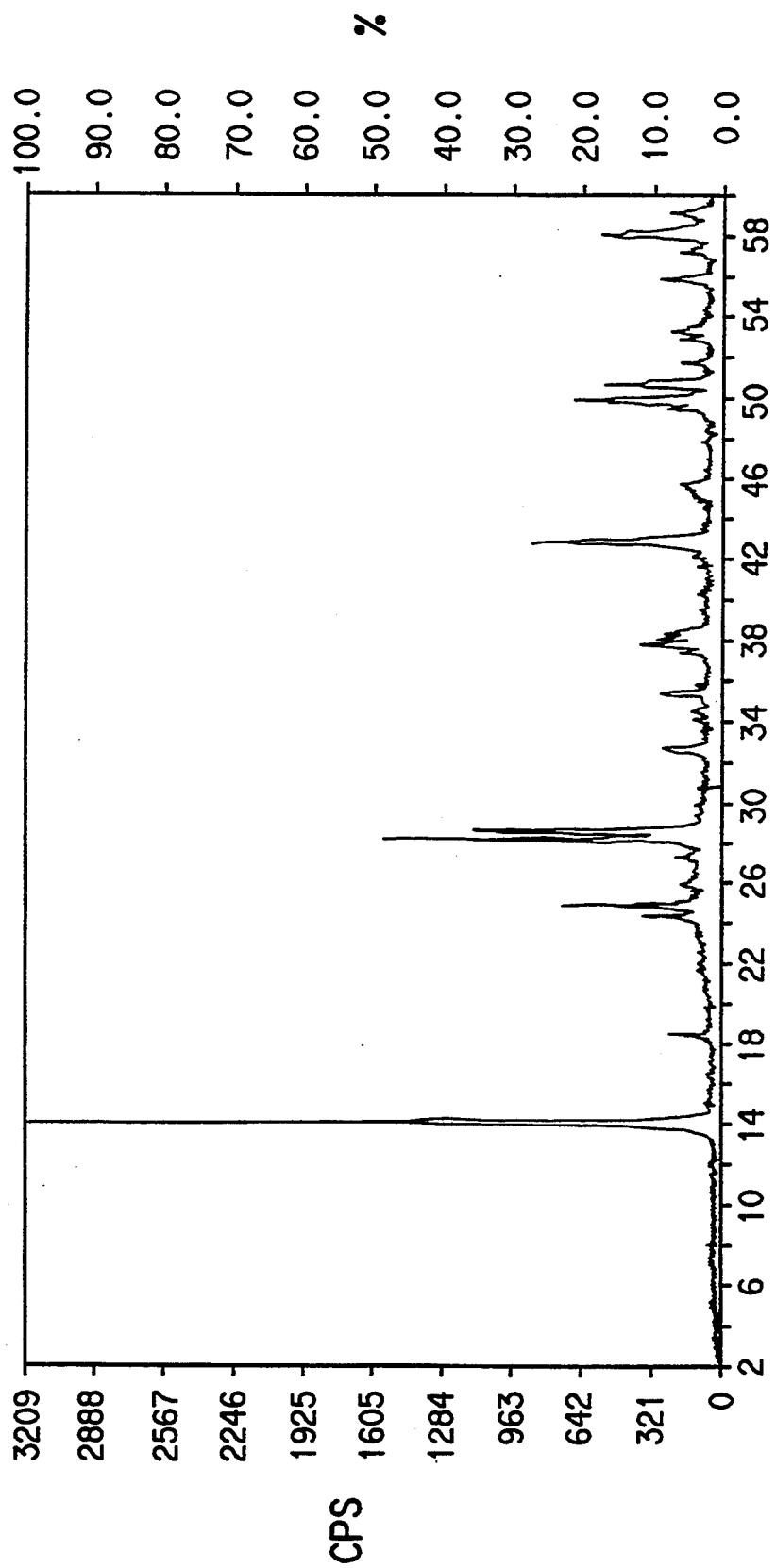
FIG. 1 depicts the powder X-ray diffraction pattern of the beta phase of $NH_4AlF_4$.
Figure 2A:
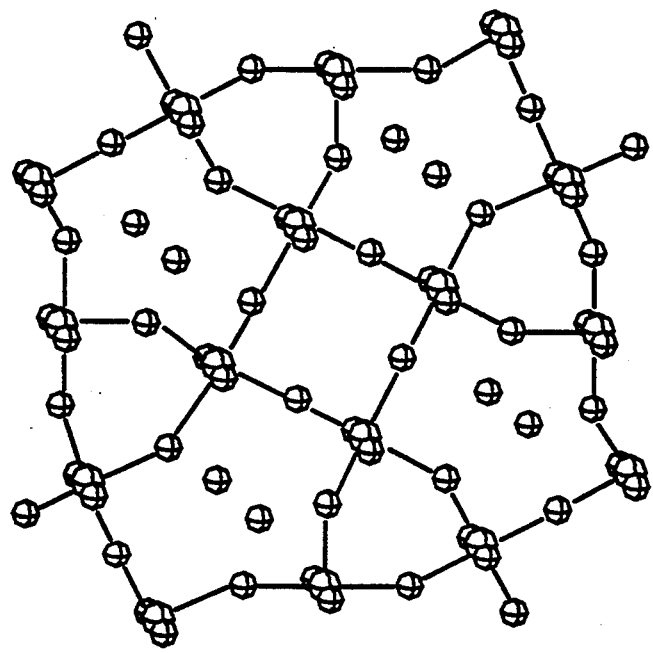
FIG. 2A depicts the crystalline structure of one layer of the beta phase of $NH_4AlF_4$.
Figure 2B:
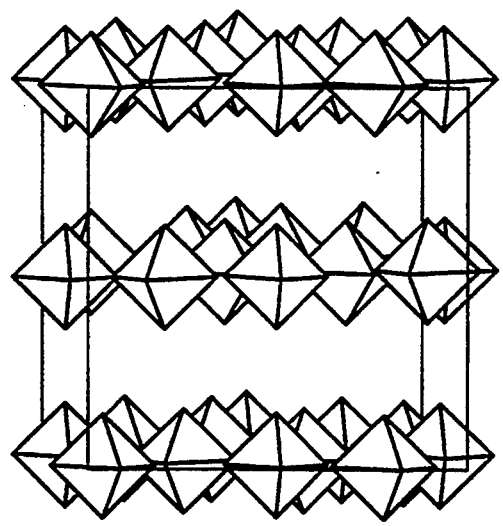
FIG. 2B depicts a side view of the crystalline structure of the beta phase of $NH_4AlF_4$.

The present invention further comprises a new crystalline phase of $NH_4AlF_4$ denoted as the beta ($\beta$) phase. This phase has a space group I4/mcm with unit cell parameters a of 11.64Å (1.164 nm) and c of 12.66Å (1.266 nm) at 25° C. Additional details of atomic parameters are provided in Table II of Example 1. The powder X-ray diffraction for beta-$NH_4AlF_4$ is depicted in FIG. 1. Major diffraction peaks occur at 13.98, 24.75, 28.08, 28.53, 42.66, 49.88, 50.64 and 57.95 degrees (2$\theta$) using X radiation of 1.54Å (0.154 nm) (CuK$\alpha$). A "ball anid stick" and a polyhedral representation of its crystalline structure is shown in FIGS. 2A and 2B respectively. The general structure of the beta phase is that of a layered structure wherein each layer is comprised of corner-shared octahedra of $AlF_6$ units. Four equatorial fluoride ions of each octahedron are shared within the layer while the remaining two axial fluoride ions are terminal and non-bridging and project into the space between the AlF layers. This interlayer space is occupied by the tetrahedral ammonium counterions. Each Al-F layer is constructed of linked $AlF_6$ octahedra such that rings of 3, 4 and 5 bridged Al atoms are produced. Registry between the layers is not maintained such that the 3,4 and 5 membered rings do not line up and so no channels persist through the structure. This structure closely resembles that of a phase of the material RbAlF$_4$. The beta phase of NH$_4$AlF$_4$ is useful as a precursor in the preparation of the kappa phase of AlF$_3$.

The present invention further comprises a process for the preparation of the kappa phase of AlF$_3$. This process comprises the pyrolysis of beta-NH$_4$AlF$_4$ to generate kappa AlF$_3$ is summarized in equation 2. Such pyrolysis is conducted in an appropriate furnace or thermogravimetric analyzer at a temperature range of from about 350° C. to about 600° C. preferably at about 550° C. The pyrolysis is preferably conducted in a dry inert atmosphere such as nitrogen, argon, or helium. A typical reaction time is from about 5 minutes to about 8 hours but can be as long as desired. Preferred is about 30 minutes. The reaction is conducted at vacuum to about 100 atm (1×10$^7$ Pascals), preferably at from about 0.1 to about 2 atm (1×10$^4$ to 2×10$^5$ Pascals). The reaction works best if conducted in a flow environment for removal of volatiles. The desired kappa AlF$_3$ is collected as a solid product.

Figure 3:
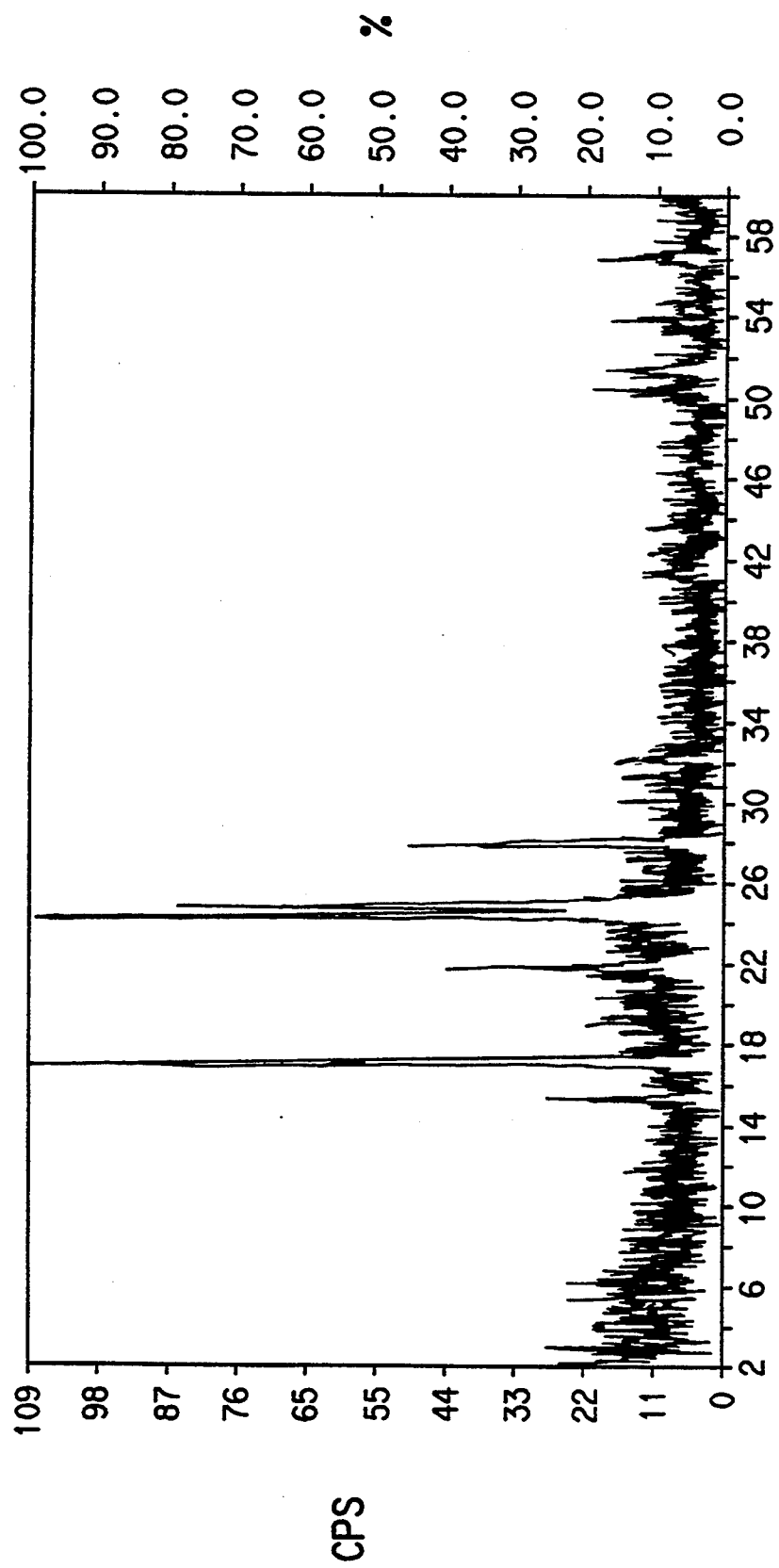
FIG. 3 depicts the powder X-ray diffraction pattern of the kappa phase of $AlF_3$.
Figure 4A:
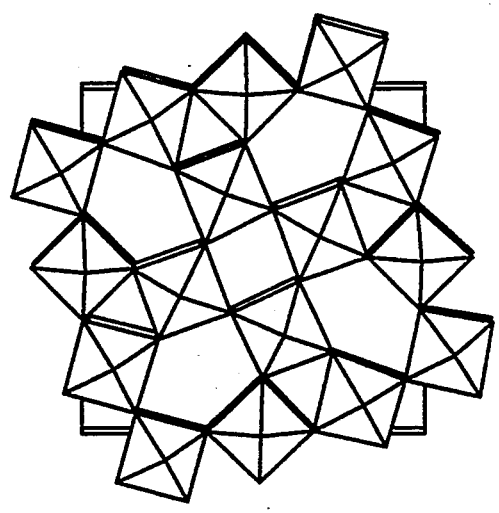
FIG. 4A depicts the crystalline structure of two layers of the kappa phase of $AlF_3$.
Figure 4B:
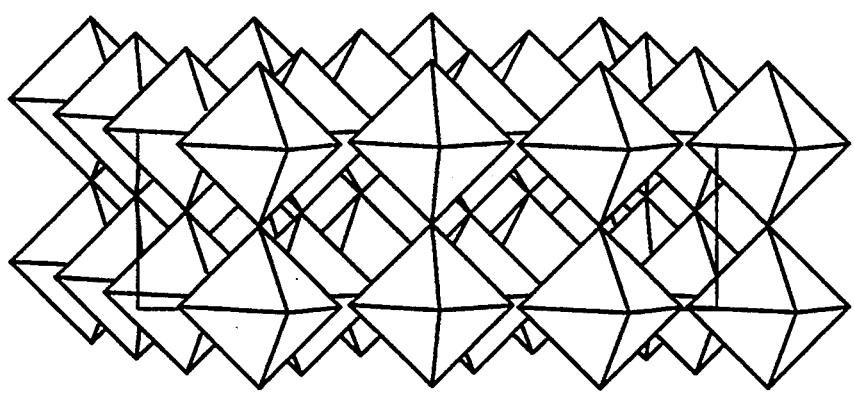
FIG. 4B depicts a side view of the crystalline structure of the kappa phase of $AlF_3$.

The present invention further comprises a new crystalline phase of AlF$_3$ denoted the kappa ($\kappa$) phase. This compound has am X-ray diffraction pattern with peaks at 15.48, 17.30, 22.00, 24.62, 25.09, 28.13, 32.28 and 57.02 degrees (2$\Theta$) using X radiation of 1.54Å (0.154 nm) (CuK$\alpha$) as shown in FIG. 3. The structure of this new phase kappa-AlF$_3$ has been elucidated by combined X-ray diffraction and neutron powder diffraction analysis and is shown in FIGS. 4A and 4B. The structure revealed by these techniques is previously unknown for AlF$_3$. This structure is that of corner-shared [AlF$_6$] octahedra which are linked together in a manner reminiscent of the precursor beta-NH$_4$AlF$_4$ structure. The structure can be considered to be constructed of layers of corner shared AlF$_6$ octahedra in exactly the same connectivity as the layers of the beta-NH$_4$AlF$_4$ precursor (i.e., rings of 3, 4 and 5 F bridged Al atoms). These layers are now in perfect registry—i.e., the various ring sizes line up from layer to layer—producing channels through the structure. The layers are then fused together by Al-F-Al linkages such that all F atoms act as bridges between octahedra and producing a new dense AlF$_3$ structure.

The kappa-AlF$_3$ phase has a space group P4/mbm and a unit cell with cell constants a=11.41Å (1.141 nm) and c=3.54Å (0.354 nm) at 25° C. Additional details of atomic parameters are provided in Table IV of Example 2. The kappa phase of AlF$_3$ is useful as a catalyst in fluorocarbon transformations such as isomerization and fluorination reactions.

The present invention further comprises the preparation of the alpha phase of AlF$_3$ comprising the calcination or pyrolysis of the kappa phase of AlF$_3$ as shown in Equation 3. The calcination is conducted at a temperature of from about 600° C. to about 900° C., preferably at about 650° C. Use of a dry inert atmosphere such as nitrogen, argon, or helium is preferred, with the exclusion of water. The reaction can be run for about 30 minutes to about 8 hours, and typically is conducted for about 60 minutes to about 2 hours. A pressure of from vacuum to about 10 atm (1×10$^6$ Pascals) can be employed, preferably from about 0.1 to about 2 atm (1×10$^4$ to 2×10$^5$ Pascals). The desired product is collected as a solid using conventional isolation techniques.

While the alpha phase of AlF$_3$ is the thermodynamically most stable, the beta, eta, theta and kappa phases do not interconvert amongst themselves. There is, therefore, no structural progression through these phases en route to alpha. The phase of AlF$_3$ produced in any given synthesis is apparently dictated by the temperature of synthesis and especially by the precursor from which it is made.

EXAMPLE 1

Preparation of beta-NH$_4$AlF$_4$

Inside a nitrogen filled glove box, 5 g of pyHAlF$_4$ was dissolved in 10 mL of warm formamide solvent. With vigorous stirring, the clear solution was heated to about 180° C. in an open vessel whereupon it began to boil and fizz vigorously. After holding at this temperature for 5 minutes the clear solution began to boil much less vigorously and a translucent pale precipitate appeared. The solution was allowed to cool back to room temperature whereupon the white precipitate (~2 g) was collected by filtration. The collected solid was washed with methanol and suction dried to a fine white microcrystalline powder. X-ray diffraction powder data is depicted in FIG. 1 and Table I. A sample of this powder was subjected to Rietveld powder diffraction analysis and the structure solved. The data is tabulated below in Table II and the structure is depicted in FIGS. 2A and 2B. The sample was also subjected to chemical analysis: Calcd. for H$_4$NAlF$_4$: H 3.33%; N 11.57%; F 62.8%; Al 22.3%; Found: H 3.21%; N 11.57%; F 62.2%; Al 22.7%.

TABLE I

Beta-NH$_4$AlF$_4$
X-radiation (CuK$\alpha$) wavelength = 1.54 Å (0.154 nm)

| Peak Angle (2$\theta$). | D spacing (ang) | I/Imax, % |
|---|---|---|
| 13.98 | 6.3361 | 100 |
| 24.75 | 3.3970 | 20 |
| 28.08 | 3.1781 | 46 |
| 28.53 | 3.1287 | 32 |
| 42.66 | 2.1195 | 25 |
| 49.88 | 1.8283 | 19 |
| 50.64 | 1.8026 | 15 |
| 57.95 | 1.5915 | 15 |

TABLE II

Beta-NH$_4$AlF$_4$
Crystal System: tetragonal
Space Group: I4/mcm
Lattice Dimensions:
a: 11.639 Å (1.1639 nm)
c: 12.600 Å (1.2660 nm)
ATOMIC COORDINATES:

| SER | NAME | X | Y | Z |
|---|---|---|---|---|
| 1 | AL(1) | 0.50000 | 0.00000 | 0.00000 |
| 2 | AL(2) | 0.20774 | 0.07361 | 0.00000 |
| 3 | F(3) | 0.34121 | 0.00051 | 0.00000 |
| 4 | F(4) | 0.50000 | 0.00000 | 0.13580 |
| 5 | F(5) | 0.14123 | −0.06684 | 0.00000 |
| 6 | F(6) | 0.28417 | 0.21583 | 0.00000 |
| 7 | F(7) | 0.20567 | 0.07783 | 0.13964 |
| 8 | N(8)* | 0.33852 | −0.16148 | 0.19972 |
| 9 | N(9)* | 0.00000 | 0.00000 | 0.25000 |

*The fractional occupancy of the N atoms was higher than one, and the thermal parameters were quite high to compensate for the contributions of the four hydrogen atoms attached to each nitrogen. The numbers quoted here were refined from synchrotron data but very similar results were obtained from the refinement of Scintag data.

EXAMPLE 2

Preparation of kappa-AlF$_3$ 2 g of the beta-NH$_4$AlF$_4$ material prepared as described above in Example 1 was loaded into a quartz boat and loaded into a horizontal tube furnace with quartz liner. Dry nitrogen or dry air was flowed through the liner and across the solid sample at 500 mL/min. The sample was then ramped up in temperature at 10° C./min to 550° C. and held there for 30 minutes. After cooling back to room temperature the white solid was recovered and sent for X-ray diffraction analysis. The resultant powder diffraction pattern is depicted in FIG. 3 and Table III. Detailed Reitveld analysis of such a pattern has been completed and the crystal structure of the new kappa phase $AlF_3$ determined. Details are listed below in Table IV and the structure is depicted in FIGS. 4A and 4B.

TABLE III

Kappa-$AlF_3$

X-radiation (CuKα) wavelength = 1.54 Å (0.154 nm)

| Peak Angle (2θ) | D spacing (ang) | I/Imax, % |
|---|---|---|
| 15.48 | 5.7243 | 14 |
| 17.30 | 5.1267 | 100 |
| 22.00 | 4.0404 | 24 |
| 24.62 | 3.6157 | 99 |
| 25.09 | 3.5490 | 71 |
| 28.13 | 3.1723 | 44 |
| 32.28 | 2.7731 | 11 |
| 57.02 | 1.6151 | 13 |

TABLE IV

Kappa-$AlF_3$
Crystal System: tetragonal
Space Group: P4/mbm
Lattice Dimensions:
a: 11.406 Å (1.1406 nm)
c: 3.544 Å (.3554 nm)

ATOMIC COORDINATES AS PRESENTLY REFINED:

| SER | NAME | X | Y | Z |
|---|---|---|---|---|
| 1 | AL(1) | 0.42426 | 0.28999 | 0.00000 |
| 2 | AL(2) | 0.50000 | 0.00000 | 0.00000 |
| 4 | F(4) | 0.42193 | 0.29602 | 0.50000 |
| 5 | F(5) | 0.35735 | 0.43218 | 0.00000 |
| 6 | F(6) | 0.50578 | 0.15368 | 0.00000 |
| 8 | F(8) | 0.28333 | 0.21667 | 0.00000 |
| 10 | F(10) | 0.50000 | 0.00000 | 0.50000 |

What is claimed is:

1. A compound comprising the beta phase of $NH_4AlF_4$ having space group I4/mcm and having unit cell parameters of a equal to 11.64Å (1.164 mm) and c equal to 12.66Å (1.266 nm) at 25° C.

2. A compound comprising the kappa phase of $AlF_3$ having space group P4/mbm and unit cell parameters of a equal to 11.41Å (1.141 nm) and c equal to 3.54Å (0.354 nm).

3. A process for the preparation of the beta phase of $NH_4AlF_4$ comprising reacting pyridineH$AlF_4$ and formamide solvent.

4. The process of claim 3 conducted at a temperature of at least about 180° C.

5. A process for the preparation of the kappa phase of $AlF_3$ comprising the pyrolysis of beta-$NH_4AlF_4$.

6. The process of claim 5 conducted at a temperature of at least about 350° C.

7. A process for the preparation of the alpha phase of $AlF_3$ comprising the pyrolysis of the kappa phase of $AlF_3$.

8. The process of claim 7 conducted at a temperature of at least about 650° C.

9. The process of claim 6 or 8 conducted in a dry inert atmosphere.

* * * * *